Patented Oct. 30, 1923.

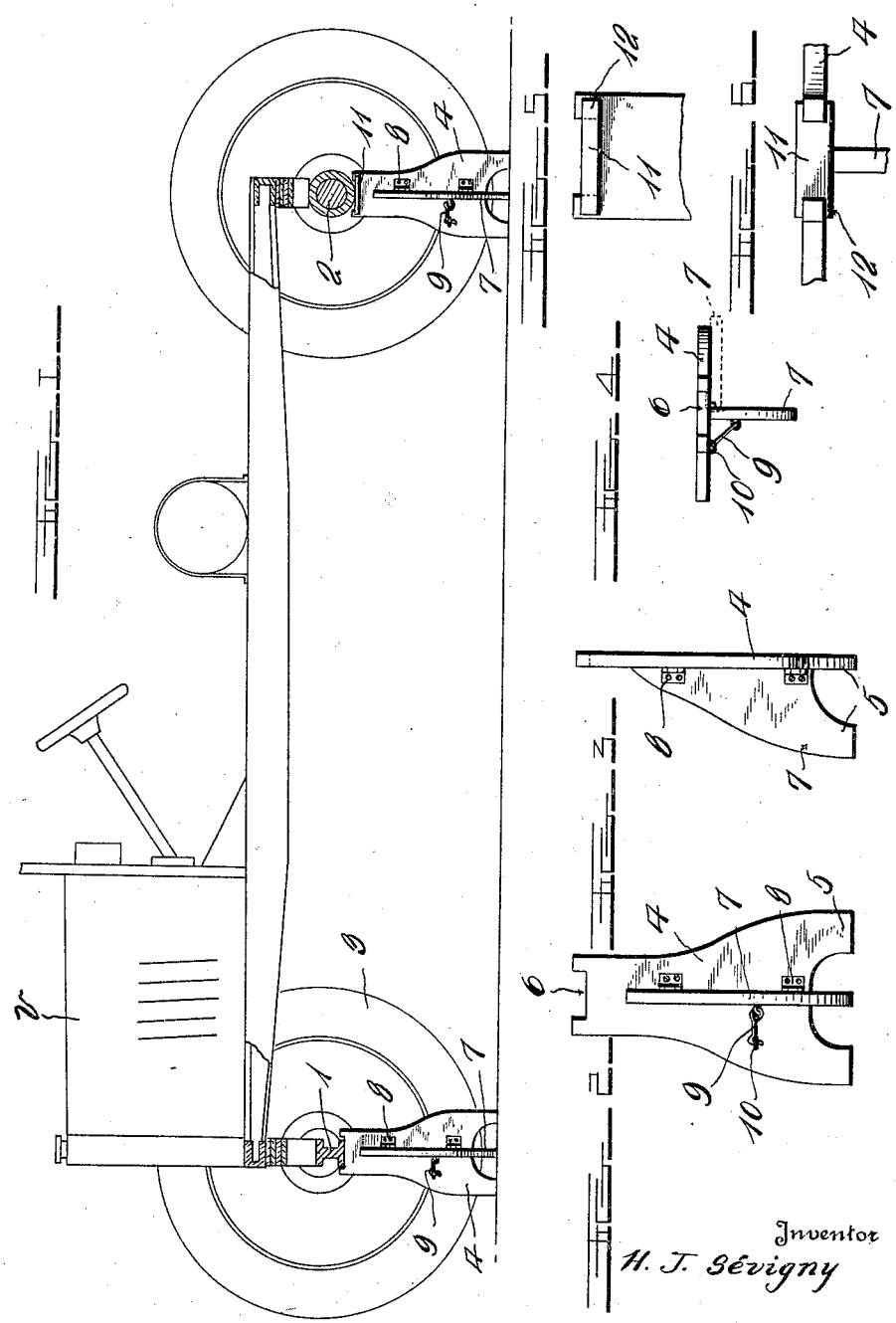

1,472,688

UNITED STATES PATENT OFFICE.

HOLLIS J. SÉVIGNY, OF SANFORD, MAINE.

SUPPORT.

Application filed April 6, 1922. Serial No. 550,198.

*To all whom it may concern:*

Be it known that I, HOLLIS J. SÉVIGNY, a citizen of the United States of America, residing at Sanford, in the county of York and State of Maine, have invented certain new and useful Improvements in Supports; and I do hereby declare that the following is a full, clear, concise, and exact description of the invention, such as will enable others skilled in the art to which it appertains to make and use the same.

This invention relates to improvements in supports having for an object to provide a novel form of automobile jack or stand especially advantageous for use with the storage of an automobile for a lengthy period of time, whereby the wheels of such automobile will be relieved of the load of the same and in consequence, will lessen deterioration of the pneumatic tires thereon by reason of long standing together with the constant and unvarying application of pressure thereon.

It is likewise an object of the invention to provide a jack of the character mentioned which may be employed for receiving and supporting either the front or rear axle of an automobile, the same being provided with an attachment whereby the difference between the relative height or clearance of the two axles with relation to the ground may be compensated for in order that the wheels will be supported free of the ground or other receiving surface.

Other objects will be in part obvious and in part pointed out hereinafter.

In order that the invention and its mode of operation may be readily understood by persons skilled in the art, I have in the accompanying illustrative drawings and in the detailed following description based thereon, set out one possible embodiment of the same.

In these drawings:

Figure 1 is a vertical longitudinal section through a motor driven vehicle showing the front and rear axles thereof received and supported upon my improved jacks;

Figure 2 is an elevation of the improved jack;

Figure 3 is a similar view taken at substantially right angles to the Figure 2;

Figure 4 is a top plan view of the jack;

Figure 5 is an enlarged fragmentary detail in elevation showing the arrangement of the compensating attachment in the upper end of the jack; and Figure 6 is a fragmentary detail in top plan showing the arrangement of the compensating attachment in the upper end or seat of said jack.

Having more particular reference to the drawings, in connection with which like characters of reference will designate corresponding parts throughout, V represents generally, a motor driven vehicle provided, as is usual, with forward and rearward axles 1 and 2 respectively. In this connection, it is to be borne in mind that the clearance of the rear axle 2 from the ground is usually greater than that of the forward axle 1 and in consequence, when supporting the same so as to relieve the wheels 3 of the vehicle from load, such difference in clearance must be provided for.

The improved jack, of which two are shown in the Figure 1, may be stated to comprise a body portion 4 having the lower part thereof enlarged and curved to provide legs 5 upon its lower end, while the upper or reduced portion of the body is formed with a squared seat 6 of a depth sufficient to receive adjacent portions of either of the axles 1 and 2 therein and in addition, to provide abutments upon the opposite sides thereof whereby to prevent lateral displacement of said axles with relation to the seat; the arrangement being well shown in the Figure 1, wherein the opposite sides of the seat 6 afford effectual abutments against which the adjacent portions of either of the axles 1 and 2 may engage, without liability of lateral displacement.

The body portion 4 is of a height sufficient to effect the raising of the forward wheels 3 of the vehicle free from the ground or other surface upon which the same is arranged, thus relieving the pneumatic tires thereon of detrimental stress. To retain the body portion 4 in its vertical or substantially vertical supporting position, a third leg 7 is provided, having a straight edge formed upon the upper side thereof and arranged adjacent the body portion 4 as clearly shown in the Figure 3, in order that hinged connection as indicated at 8 may be effected between the several elements. The hinged connection 8 is such as will permit of the swinging movement of the legs 7 in one direction into substantial parallelism with the body portion 4, while movement of the same in an opposite direction will be prevented by reason of the flush straight edge engagement of the upper portion thereof with the adjacent portion of said body as indicated in the Figure 2. To retain the leg 7 in its operative position or at substantially right angles to the body portion 4 and the several legs 5 thereon, I may and preferably do pivotally secure a hook 9 to the same and engage the free end thereof in an eyelet or suitable keeper 10 secured to an adjacent portion of the body portion 4. In this way, movement of the hinged leg 7 subsequently to the arrangement of the same in a position at substantially right angles with relation to the body 4 will be prevented and obviously, the jack will be firmly retained in its vertical or substantially vertical position whereby it may effectually support the front axle 1 of the vehicle V.

Inasmuch, as hereinbefore stated, as the clearance of the rear axle 2 with relation to the ground is greater than that of the axle 1, it is desirable that means for compensating for such clearance be provided the jack in order that the rear wheels of the vehicle will be supported free of the ground or other surface on which it is arranged. To this end, I provide an auxiliary seat or block 11, bifurcating the opposite ends thereof as at 12 in order that they will snugly embrace or engage the abutments arranged upon the opposite sides of the seat 6 formed in the reduced or upper end of the body portion 4; said auxiliary seat 11 being of a length corresponding to the seat 6 and in consequence, being snugly received therein in the manner as clearly shown in the Figures 5 and 6. With arrangement of the auxiliary seat 11 in the main or principal seat 6, it, of course, will be understood that means will be provided for compensating for the greater clearance of the rear axle 2 with relation to the ground. Therefore, the rear wheels on said axle will be supported free of the ground and in consequence, relieved of the accompanying detrimental stress.

It is to be understood that the thickness or depth of the auxiliary seat 11 may be varied, such as conditions or preference may dictate, and likewise, that the depth of the seat 6 may be accordingly varied.

Manifestly, the construction shown is capable of considerable modification and such modification as is within the scope of my claims, I consider within the spirit of my invention.

I claim:

1. An automobile jack comprising a main section and an auxiliary section hingedly connected thereto, the upper end of said main section being bifurcated, forming a recessed seat for the reception of an axle of the automobile, elevating blocks adapted to be detachably secured within said recessed seat, the opposite ends of said blocks being bifurcated whereby they may engage the bifurcated upper ends of said main section for retaining the blocks in place, substantially as and for the purpose specified.

2. An automobile jack comprising a flat board having one face thereof adapted to rest adjacent one wheel of the automobile, the lower end of said board being enlarged and terminating in a pair of spaced legs, an auxiliary leg hingedly connected to the opposite face of said board, the upper end of said auxiliary leg terminating short of the upper end of said board, locking means for connecting said auxiliary leg to said board whereby the auxiliary leg may be retained at right angles to said board, the upper end of said board being bifurcated to form a recessed seat, and an auxiliary seat adapted to be retained within said recess seat substantially as and for the purpose specified.

In witness whereof I have hereunto set my hand.

HOLLIS J. SÉVIGNY.